Inventor
Julius Lohse
Watson E. Coleman
Attorney

Patented Jan. 21, 1941

2,229,383

UNITED STATES PATENT OFFICE 2,229,383

APPARATUS FOR THE DIRECT RECOVERY FROM ORES OF HEAVY METALS OF THE NONFERROUS GROUP

Julius Lohse, Berlin, Germany

Application September 14, 1939, Serial No. 294,942

12 Claims. (Cl. 266—36)

This invention pertains to the class of metallurgy and more particularly to improvements in apparatus for the direct recovery of metals, particularly nonferrous metals, from their ores. The present application constitutes a continuation in part of my copending application, Ser. No. 182,110, filed December 28, 1937.

The present invention has to do with apparatus in which present-day chemical-metallurgical processes for the recovery of nonferrous metals such as copper and the like from ores, can be carried out with maximum utilization of heat and in continuous operation in the treatment of metal from the crude ore stage up to the finished metal.

A particular object of the invention herein disclosed is to provide in a furnace structure designed to carry out the stated process, an improved form of converter by means of which the Bessemerizing step may be more efficiently carried out and wherein the maintenance of proper temperatures may be more easily accomplished and the formation of copper oxide in the copper bath prevented.

The invention is illustrated by way of example in the accompanying drawings, wherein:

Fig. 1 shows in longitudinal section a furnace system according to the invention.

Fig. 2 illstrates a longitudinal section through the central portion of the settler-converter furnace drum showing the partition structure between these units.

Fig. 2ª is an enlarged detailed view illustrating a bustle plate retaining spring and pin.

Figure 1:
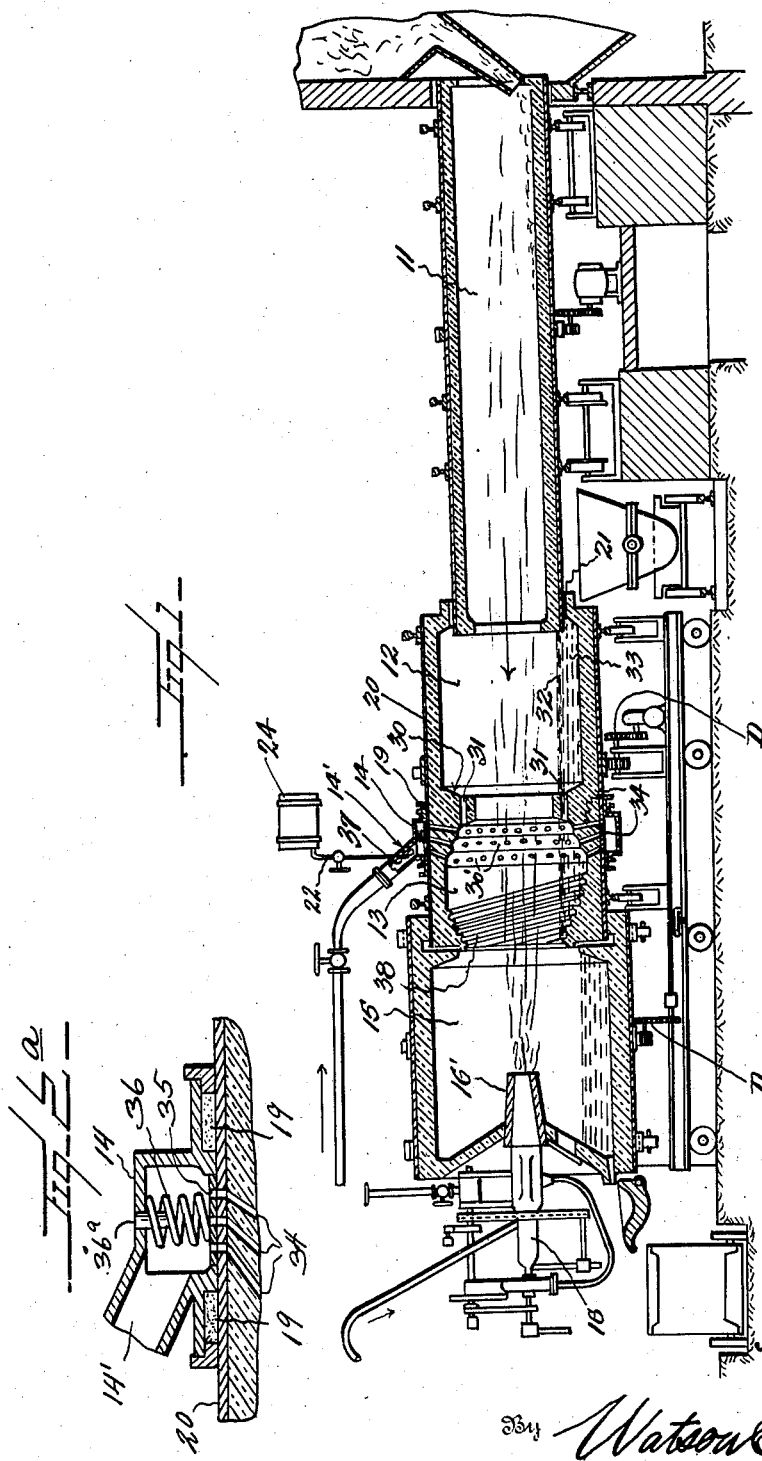

In accordance with the invention roasted material is conducted in hot condition to a furnace system comprising a plurality of furnaces, which interengage telescopically or in stuffing-box fashion and each of which is preferably furnished with a separate drive and is capable of being moved out separately for the purpose of repairs and overhauling. This furnace system comprises a portion of my complete rotary furnace system as it is disclosed in my original application hereinbefore referred to and consists of the final roasting and preheating chamber 11, the settler 12, the converter 13 and the refining drum 15, and is heated by the burner 16 with a long flame directed through the nozzle 16' in opposition to direction of movement of the charge. This burner is such that by means of the same a mixture of liquid and solid fuels, the latter in pulverulent form, together with additions of a desired kind can be projected in a long flame into the refining drum 15.

The flame from the burner 16 passes along the axis of the complete system through all of the rotary furnaces making up the system and is maintained by the suction created in the system by a suitable fan, not shown.

In the final roasting and pre-heating chamber 11, the charge supplied in the hot state is finally roasted and preliminarily fused and in this fused condition it passes into the settler 12 where the slag is separated from the metal.

Figure 2:
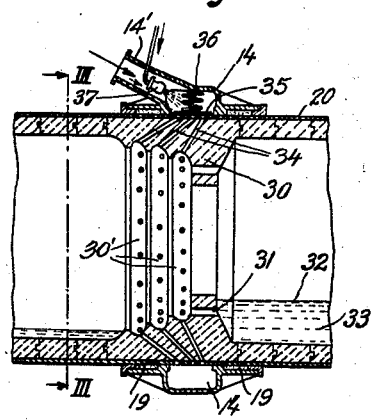
Figure 4:
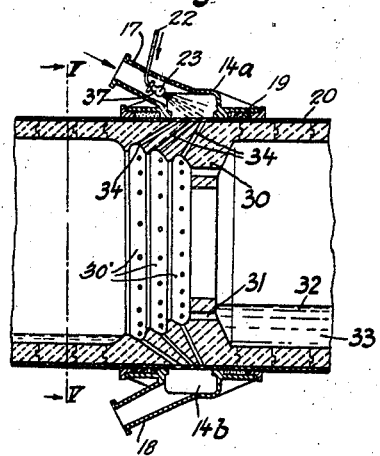
Fig. 4 is a sectional view similar to Fig. 2, but showing a slight modification of the bustle pipe structure.

The settler 12 and converter 13 are in the form of a cylindrical structure and are designed to provide at the point of separation between the two chambers 12 and 13 an inwardly directed annular wall which forms a part or continuation of the lining of the furnace, which wall is indicated generally by the numeral 30 and is illustrated in detail in Figs. 2 and 4. This wall is formed upon the side toward the settler to have a steep face whereby an accumulation of the fused material within the settler is brought about but upon the side of the wall looking into the converter chamber, the wall is formed to provide a concentrically arranged series of annular terraces 30' of progressively increasing diameter from the settler toward the converter. These terraces are recessed or depressed so as to form annular channels.

The annular wall 30 is provided below the edge thereof with passages 31 which extend longitudinally of the furnace and are designed so that the slag 32 floating upon the fused material is prevented from running out of the settler into the converter while the molten material 33 is able to pass through the passages 31 to the converter chamber by way of or over the annular terraces 30'. In flowing into the converter across the channeled terraces 30', the molten material passes or flows over the orifices of tuyères 34 which open through the bottom of the terraces and through these tuyères there is forced a current of air by means of a suitable air compressor or in any other suitable manner (not shown) for the purpose of aerating the molten material. For accomplishing the discharge of air under pressure through the tuyères or passages 34, there is provided around the settler-converter unit a bustle pipe or annular manifold 14 having two stuffing boxes 19 one upon each side thereof which have air-tight contact with the shell 20 of the drum and a pipe connection 14' for the introduction of air. Within this manifold there is disposed a thin steel band 35 which rests upon and partially encircles the outer side of the steel shell of the furnace drum and which is held by means of suitable springs and pins 36 and 36a respectively, Fig. 2a in firm contact with the drum.

The band 35 encircles substantially two-thirds of the circumference of the drum and closes or seals off the upper tuyères 34 against the passage of air therethrough so that only those tuyères which are situated below the molten metal in the drum are open for the passage of air through such metal which is flowing from the settler to the converter over the trough-like or channeled annular terraces 30'.

In this terraced aerating hearth, there are removed the last impurities as slag. The slag and blister copper are caused to pass from the converter by the rotary movement of the latter and the provision of the helical grooves 38 which are formed in the lining of the converter, into the refining drum 15 where they can be separately tapped. The refining drum may be provided with a working door for the usual assaying, pooling the bath, slag skimming and the like. The rich slag which is removed from the refining drum may be re-run through the system for re-smelting.

The poor slag is removed from the settler chamber 12 by allowing it to flow off through the gap 21 between the pre-heating drum 11 and the drum 12 and is received in suitable slag trucks.

The single furnace drums of the furnace system may be electrically or otherwise suitable driven by separate drives D as illustrated in Fig. 1 whereby it will be possible to regulate the operation of each drum at the will of the operator.

In certain instances, dependent on the quantity of raw material, it may be necessary to make use of a more intense heat in the last refining stages. For this purpose there is provided in the pipe connection by means of which air is introduced into the annular terraced areas 30', a tuyère 37 adapted to inject heavy oils by means of which there may be introduced, for example, a mixture of air and oil vapors.

Figure 3:
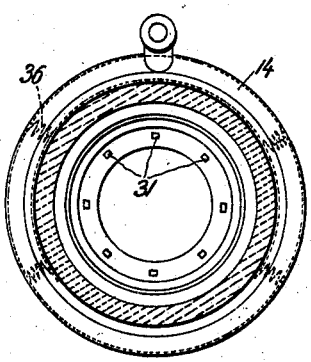
Fig. 3 is a sectional view taken on the line 3—3 of Fig. 2.
Figure 5:
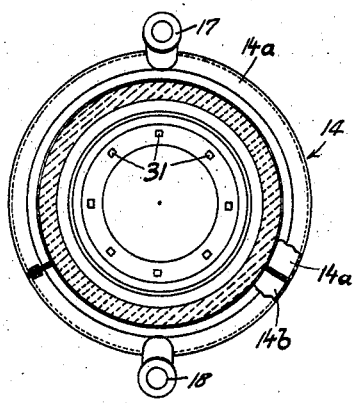
Fig. 5 is a sectional view on the line 5—5 of Fig. 4.

In Figs. 4 and 5, there is illustrated a modification of the structure shown in Figs. 2 and 3. In this modified form, the non-rotating manifold or bustle pipe 14 is divided into two sections or parts, one of these, indicated by the numeral 14a, covering substantially two-thirds of the upper circumference of the furnace drum for the introduction of a mixture of oil and air into the upper tuyères 34. This upper section has a pipe 17 connected therewith for the introduction of air and running into this pipe is a fuel oil conducting pipe 22 which terminates in a nozzle 23 by which oil may be introduced with the air. An oil supply tank 24 is shown with which the oil pipe line 22 is connected. The other part of the manifold, indicated by the numeral 14b, is provided with a pipe connection 18 for the introduction of air under pressure into the tuyères below the molten metal.

By this apparatus it is possible to prevent the formation of cuprous oxide in the copper bath, the cuprous oxide being immediately reduced to metallic copper owing to the presence of C and $H_2$ formed by the cracking of $CH_4$ and $C_2H_4$ forming the oil injected with the air. On the upper side of the copper bath the said oil gases injected with the blowing air are caused to be ignited ($C_1H_2,CO$ being formed), so that a very high temperature is obtained at this point and it is quite impossible for the copper charge to be blown cold, such as occurs frequently in the processes at present in use.

The blown blister copper is discharged from the converter shell 13, for example by a helical firebrick lining 38, so that the blister copper is discharged continuously into the refining drum 15, which is sufficiently large to act as a container. Very little refining requires to be done at this stage, as the converter 13 has worked up the blister copper by treating it as a thin band whilst it is passing over the inclined terrace-like tuyère zone, so that all impurities are collected in a very liquid slag, passing with the blister copper to the refining drum.

In carrying out the process of recovering metals in apparatus such as is here disclosed there are four sources of heat to maintain the processes carried out continuously in 11, 12, 13 and 15, quite apart from the fact that the charge is already heated as a result of the primary roasting operation.

The first source of heat is represented by the burner 16, which projects a long and powerfully whirling flame into the entire system of furnace drums.

The second source of heat is constituted by the burning of sulphur contained in the white and blue metal bath, pouring through the partition openings into the converter section, to be blown there instantly to a blister copper.

The third source of heat is represented by the development of calories by combustion of the cracked oil gases injected with the blowing air into the bustle pipe 14 and the tuyère system.

Fourth source of heat: The large surfaces of the refining bath 15 with tons of liquid metallic copper and the revolving firebrick lining raised to temperature by the burner 16. The surplus of heat from the combustion of the sulphur and oil gases in the converter and the flame heat itself constitute the means by which the process in the drum 11 of practically dead roasting and rapid smelting of charge material rich in copper is rendered possible, so that no poor matte, but rich blue and white metal is formed.

It will be understood that numerous modifications are quite possible, without departing from the spirit of the invention.

What is claimed is:

1. In an apparatus of the character set forth, a converter rotary shaft drum having Bessemerizing tuyères opening thereinto, a non-rotating manifold completely encircling the drum and communicating with said tuyères by which air under pressure is supplied to the tuyères, and a stationary band disposed within the manifold over the top of and partially encircling and lying against the drum and covering only those tuyères lying above molten material in the drum, the remaining tuyères below the band and lying below the material being uncovered for the passage of air thereinto from the manifold.

2. In an apparatus of the character set forth, a converter rotary shaft drum, a non-rotating manifold encircling the drum and communicating with Bessemerizing tuyères leading through the wall of and into the drum, means for preventing air from passing from the manifold through only those tuyères lying above the level of molten material in the drum, the tuyères lying below the molten maetrial being in communication with the manifold, and means for discharging a fuel oil into the drum through those tuyères lying below the molten metal level therein.

3. In an apparatus of the character set forth, a converter rotary shaft drum, a non-rotating manifold encircling the drum and communicating with Bessemerizing tuyères leading through the wall of and into the drum, means for preventing air from passing from the manifold through only those tuyères lying above the level of molten material in the drum, the tuyères lying below the molten material being in communication with the manifold and means for injecting fuel oil into the manifold with the introduced air.

4. In a structure of the character described, a rotary drum, an annular wall dividing said drum into two chambers, said wall upon one side having a substantially straight face and upon the opposite side being formed to provide a terraced series of concentrically arranged annular troughs, the wall having a series of passages formed therethrough parallel with the drum and spaced from the edge of the wall, an air manifold encircling said drum, and said drum having a series of air passages formed therethrough and disposed circumferentially thereabout and establishing communication between said manifold and the bottoms of said troughs.

5. In a structure of the character described, a rotary drum, an annular wall dividing said drum into two chambers, said wall upon one side having a substantially straight face and upon the opposite side being formed to provide a terraced series of concentrically arranged annular troughs, the wall having a series of passages formed therethrough parallel with the drum and spaced from the edge of the wall, an air manifold encircling said drum, said drum having a series of air passages formed therethrough and disposed circumferentially thereabout and establishing communication between said manifold and the bottom of said troughs, and means within the manifold and extending partially about the drum for confining the passage of air from the manifold through the air passages lying within a prescribed circumferentially extending area of the drum.

6. In a structure of the character described, a rotary drum, an annular wall dividing said drum into two chambers, said wall upon one side having a substantially straight face and upon the opposite side being formed to provided a terraced series of concentrically arranged annular troughs, the wall having a series of passages formed therethrough parallel with the drum and spaced from the edge of the wall, an air manifold encircling said drum, said drum having a series of air passages formed therethrough and disposed circumferentially thereabout and establishing communication between said manifold and the bottoms of said troughs, and a band lying within the manifold and extending around a portion of the circumference of the drum to close the air passageways leading from the manifold into the drum through a prescribed circumferential area of the drum, said band being held stationary with the manifold with respect to the drum.

7. In apparatus of the character set forth, a converter rotary shaft drum, a non-rotating manifold encircling the drum, the drum being provided with a plurality of tuyères extending in a generally radial direction through the wall thereof and disposed throughout the circumference of the drum, said tuyères at their outer ends communicating with said manifold, means maintaining a stationary position within the manifold for covering and closing only those tuyères lying above the level of molten metal in the drum, the remaining tuyères forming unobstructed air passageways between the manifold and the interior of the drum below the molten metal level therein, and means for introducing air into the manifold.

8. In apparatus of the character set forth, a converter rotary shaft drum, a non-rotating manifold encircling the drum, the drum being provided with a plurality of tuyères extending in a generally radial direction through the wall thereof and disposed throughout the circumference of the drum, said tuyères at their outer ends communicating with said manifold, means maintaining a stationary position within the manifold for covering and closing only those tuyères lying above the level of molten metal in the drum, the remaining tuyères forming unobstructed air passageways between the manifold and the interior of the drum below the molten metal level therein, and means for introducing air into the manifold, the said tuyères being disposed throughout the circumference of the drum in a plurality of groups spaced longitudinally of the drum and the tuyères of each group extending through the wall of the drum at an angle with respect to the tuyères of the other groups whereby the tuyères of the several groups lead inwardly from the manifold in divergent relation.

9. In an apparatus for the direct recovery of heavy metals of the nonferrous group from ores and other primary materials, a settler chamber and a converter chamber formed in one single rotary shaft furnace, having a lining formed to provide an inwardly directed annular wall forming a line of separation between the two chambers, which annular wall is greatly inclined towards the settler but is weakly inclined and of terrace-like form towards the converter, tuyères being provided in the said terrace-like portion for Bessemerizing the material, openings being provided in the annular wall permitting passage of the molten white and blue metal out of the settler, whilst the slag swimming on the white and blue metal is separated by specific gravity, the outer end of the settler comprising an annular wall having a lip over which the slag is discharged.

10. In an apparatus of the character described, a settler and converter consisting of a single rotary shaft furnace drum, an inwardly directed annular wall within the drum intermediate the ends thereof dividing the same into settler and converter chambers, said wall upon the converter chamber side being of gradual slope and provided throughout its circumferential extent with tuyère openings, said wall having openings extending therethrough longitudinally of the furnace for the passage of molten metal from the settler to the converter, an air manifold encircling the drum and covering said openings, the manifold being fixed against rotation, means for introducing air into the manifold, and means for maintaining closed during the rotation of the drum those passages lying above the level of metal in the converter.

11. In an apparatus of the character described, a settler and converter consisting of a single rotary shaft furnace drum, an inwardly directed annular wall within the drum intermediate the ends thereof dividing the same into settler and converter chambers, said wall upon the converter chamber side being of gradual slope and provided throughout its circumferential extent with tuyère openings, said wall having openings extending therethrough longitudinally of the furnace for the passage of molten metal from the settler to the converter, and means for introducing a fluid into the converter chamber through said passages during the rotation of the furnace, and helical grooves in the wall of the converter chamber at the outlet end of the furnace for carrying off molten metal by the rotation of the furnace.

12. In an apparatus of the character described, a settler and converter consisting of a single rotary shaft furnace drum, an inwardly directed annular wall within the drum intermediate the ends thereof dividing the same into settler and converter chambers, said wall upon the converter chamber side being of gradual slope and provided throughout its circumferential extent with tuyère openings, said wall having openings extending therethrough longitudinally of the furnace for the passage of molten metal from the settler to the converter, means for introducing air into the converter through said passages lying below the level of metal in the converter, and means for introducing a combustible fluid into the converter through the passages located above the level of metal therein.

JULIUS LOHSE.